United States Patent Office 3,548,398
Patented Dec. 15, 1970

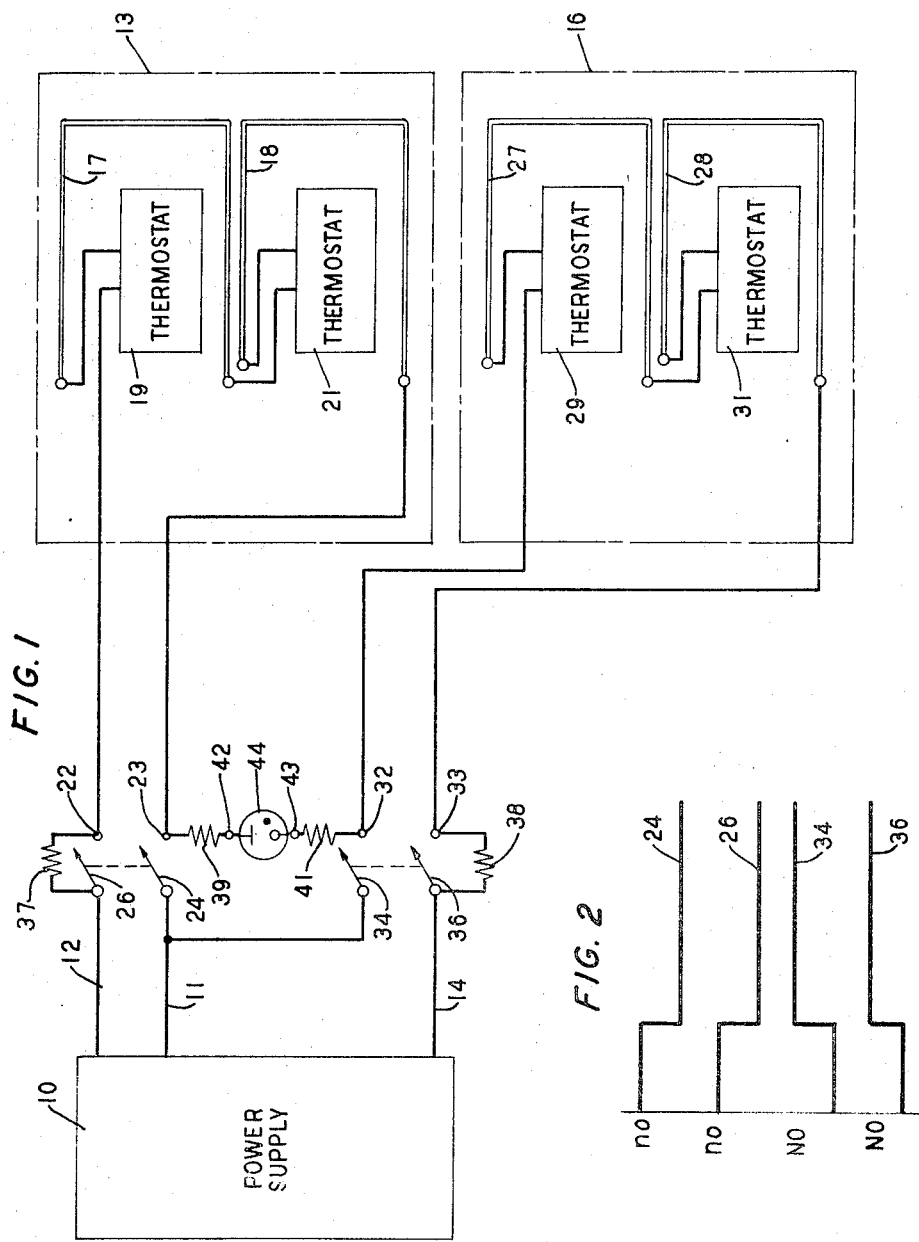

3,548,398
SWITCH POSITION AND CONTINUITY INDICATOR FOR A PAIR OF HEATING CIRCUITS
Walter E. Strimling, 63 Westcliff Road,
Weston, Mass. 02193
Filed Jan. 11, 1968, Ser. No. 697,065
Int. Cl. G08b *21/00*
U.S. Cl. 340—248     6 Claims

ABSTRACT OF THE DISCLOSURE

A monitoring circuit, for indicating the failure of a pair of heating circuits to operate in sequence or the failure of a component in a heating circuit, is described. The heating circuits are powered by a pair of voltages referred to a common potential. Power is applied to the monitoring circuit through the heating circuits. A neon light in the monitoring circuit remains ignited at least as long as both heating circuits are functioning properly or in sequence. Energization of either heating circuit brings one side of the monitoring circuit to the common potential. If both heating circuits are energized both sides of the monitoring circuit are brought to a common potential so no voltage appears across the monitoring circuit extinguishing the neon light. If one heating circuit open circuits, the neon light will extinguish when the other heating circuit is energized.

FIELD OF THE INVENTION

This invention relates to a monitoring circuit and particularly to a circuit which monitors a plurality of conditions and provides a single response when any one of the conditions is not satisfied.

BACKGROUND OF THE INVENTION

Often, industrial equipment, such as gas purification apparatus employs multiple subsystems which are required to operate in sequence. These subsystems may be required to conform to further limitations in their individual operation. For example, a pair of heating coils may be required to operate alternately. Each heating coil during operation may be restricted further to remain below a prescribed temperature while the resistance of the heating coil may be restricted to a predetermined maximum.

It is desirable to provide an indication to an operator when the equipment fails to operate according to such requirements. Some existing equipment is provided with a plurality of lamps each one to indicate a specific function. The operator is required to pay attention to each of these lamps and to remember prescribed combinations to ascertain if the equipment is functioning properly. Other equipment may employ semiconductor logic circuitry to provide a single indication of malfunction. But, logic circuitry is expensive and subject to its own internal failures.

An optimum monitoring circuit for indicating malfunction of the equipment or a portion thereof takes advantage of the natural functioning of the equipment with a minimum number of additional circuit elements. It is therefore the object of this invention to provide such a monitoring circuit.

BRIEF DESCRIPTION OF THE INVENTION

In accordance with the foregoing and other objects, a monitoring circuit having first and second terminals is connected between the like terminals of each of two two-terminal circuits, specifically, a monitoring circuit is provided in which a first impedance is connected between a first "monitoring" terminal and a second terminal of a first circuit having first and second terminals. A second impedance is connected between a second monitoring terminal and a fourth terminal of a second circuit having third and fourth terminals. First and second devices are employed to apply a common potential selectively to the second and fourth terminals respectively. The monitoring circuit is powered by applying a first voltage to the first terminal and a second voltage to the third terminal. Given an illustrative situation where the performance of two two-terminal circuits is to be monitored in combinations of their various functions, a suitable monitoring circuit is provided then merely by the addition of first and second impedances connected to corresponding terminals of the circuit to be monitored. To this arrangement is added only an indicator such as a lamp.

The first and second voltages may be either two different voltage levels with respect to the common potential or two out of phase voltages with respect to the common potential. If neither the first nor the second device is energized, neither the first nor the second circuit is energized. A potential is supplied, however, between the first and second monitoring terminals through the first circuit and the first impedance and through the second circuit and the second impedance. If the first device is energized by applying the common potential to the second terminal, a potential is still supplied between the first and second monitoring terminals through the first impedance and through the second circuit and the second impedance. In a like manner if the second device is energized, a potential is still supplied between the first and second monitoring terminals. If, however, both devices are energized, the common potential is applied to both of the monitoring terminals through the first and second impedances providing no potential therebetween.

BRIEF DESCRIPTION OF THE DRAWINGS

Other objects and advantages will become apparent by reference to the detailed description and drawings in which:

FIG. 1 is a schematic drawing of a monitoring circuit embodying the teachings of this invention; and FIG. 2 is the operating sequence for cam timer driven contacts shown in FIG. 1.

DETAILED DESCRIPTION

A power supply 10, seen in FIG. 1, provides a first voltage between a common terminal 11 and a positive terminal 12 for driving a first heater circuit 13. The power supply 10 provides a second voltage between the common terminal 11 and a negative terminal 14 for driving a second heater circuit 16.

The first heater circuit 13 includes a pair of low impedance heating coils 17 and 18 in series with each other and each in series with a normally closed thermostatic switch 19 and 21, respectively. Each thermostatic switch 19 or 21 is placed in proximate relationship to the respective heating coils 17 and 18 so that if the temperature of either of the coils 17 or 18 exceeds a predetermined temperature the switch 19 or 21 will open. It should be noted that the switches 19 and 21 are provided only to sense over temperature conditions. The temperature of the heaters is controlled by a circuit not shown. Power is applied selectively from terminals 11 and 12 to terminals 22 and 23 of the heating circuit 13 by a pair of tandem contacts 24 and 26 driven in accordance with a timing chart shown in FIG. 2.

The second heater circuit 16 includes a pair of low impedance heating coils 27 and 28 in series with each other and each in series with a normally closed thermostatic switch 29 and 31, respectively. Each thermostatic switch 29 or 31 is placed in proximate relationship to the respective heating coils 27 and 28 so that if the temperature of either of the coils 27 or 28 exceeds a predetermined temperature the switch 29 or 31 will open. Power is selectively applied from terminals 11 and 14 to terminals 32 and 33 of the heating circuit 16 by a pair of tandem contacts 34 and 36 also driven in accordance with the timing chart shown in FIG. 2.

During normal operation the heating circuits 13 and 16 are alternately energized by the pairs of contacts 24 and 26 and 34 and 36, respectively. Each heating coil 17, 18, 27, or 28 remains below a predetermined temperature and provides a low impedance path for current when energized.

To provide an indication that the heating circuits are operating normally, resistors 37 and 38 are connected across contacts 26 and 36, respectively. Resistors 39 and 41 are connected between terminals 23 and 32, respectively, and a pair of monitoring terminals 42 and 43, respectively. When the contacts 24 and 26 are closed in accordance with the timing sequence of FIG. 2, the terminal 42 is brought to the potential of the common terminal 11 through contact 24 and resistance 39. Terminal 43 is brought to the potential of negative terminal 14 through resistance 38, the heating coils 27 and 28 and the switches 29 and 31 thereby providing a signal between the monitoring terminals 42 and 43. It should be noted that if either of the contacts 29 or 31 open or if the heating coils 27 or 28 open circuit, the signal is removed from the monitoring terminals. In a like manner when the contacts 34 and 36 are closed and the contacts 24 and 26 are opened a monitoring signal is supplied to the contacts 42 and 43. When all the contacts 24, 26, 34 and 36 are opened, a monitoring signal is still supplied between terminals 42 and 43 by (1) resistor 37, heating coils 17 and 18, switches 19 and 21 and resistor 39, and (2) resistor 38, heating coils 27 and 28, switches 29 and 31 and resistor 41.

If both pairs of contacts 24 and 26 and 34 and 36 are closed energizing both heating circuits 13 and 16, it is seen that both monitoring terminals 42 and 43 are brought to the common potential by contact 24 and resistor 39 and contact 36 and resistor 41, respectively. Therefore no signal is provided between the monitoring terminals 42 and 43.

It is clear that many devices for sensing the differential voltage between the monitoring terminals 42 and 43 may be employed. It has been found that a neon glow tube operated in its constant voltage mode is particularly advantageous because it provides a visual indicator and at the same time standardizes the differential voltage between the terminals 42 and 43 notwithstanding fairly wide voltage input and current variations. The differential voltage can be used to operate an alarm device or a power cutoff device without further signal processing. The neon tube 44 taken with resistors 39 or 41 then constitutes a monitoring circuit.

One circuit which has been built and satisfactorily operated has the following values:

$V_{11-12}$—480 volts
$V_{11-14}$—480 volts
Resistors 37 and 38—10K
Resistors 39 and 41—150K
Neon tube 44—115 volt NE2H
Heating coils 17, 18, 27 and 28—240 volts with an impedance 60 ohms
Thermostatic switches 19, 21, 27 and 31—Cal-Stat made by Vulcan.

It should be understood that the described embodiment is simply illustrative of the principles of the invention and various modifications will become obvious to those skilled in the art.

I claim:

1. A circuit for providing a signal between first and second monitoring terminals indicating that both a first circuit energizable by applying a first voltage to a first terminal and a common voltage to a second terminal and a second circuit energizable by applying a second voltage to a third terminal and said common voltage to a fourth terminal is energized characterized by: a first impedance connected between said second terminal and said first monitoring terminal; a second impedance connected between said fourth terminal and said second monitoring terminal; first means for selectively applying said common potential to said second terminal; second means for selectively applying said common potential to said fourth terminal; means for applying said first voltage to said first terminal of said first circuit; means for applying said second voltage to said third terminal of said second circuit; and means connected between said first and second monitoring terminals for providing an indication.

2. In combination with the circuit defined in claim 1; a neon tube connected between said first and second monitoring terminals is the indicating means.

3. The circuit as defined in claim 1 in which said first circuit includes; a heating device; and a normally closed thermostatic switch mounted adjacent said heating device, electrically in series with said heating coil.

4. The circuit as defined in claim 1 in which said means for applying said first voltage is operable simultaneously with said first selectively applying means for applying said first voltage to said first terminal of said first circuit; and also including a third impedance connected between said first voltage and said first terminal of said first circuit.

5. The circuit as defined in claim 4 in which said first circuit includes: a heating device; and a normally closed thermostatic switch mounted adjacent said heating device, electrically in series with said heating device.

6. The circuit as defined in claim 1 in which said first circuit includes: a power consuming load device; and a normally closed switch responsive to a failure of said load device, said switch being electrically in series with said load device.

References Cited

UNITED STATES PATENTS

| | | | |
|---|---|---|---|
| 668,426 | 2/1901 | Suren | 340—252UX |
| 1,887,966 | 11/1932 | Strite | 340—252 |
| 2,588,926 | 3/1952 | Holmes | 219—487 |
| 2,654,824 | 10/1953 | Schroeder | 219—487 |
| 2,832,069 | 4/1958 | Doyle | 340—282 |
| 2,928,927 | 3/1960 | Taylor, Jr. | 219—492 |
| 3,355,729 | 11/1967 | Dayson | 340—848 |

ALVIN H. WARING, Primary Examiner

D. MYER, Assistant Examiner

U.S. Cl. X.R.

219—506; 340—252, 256